US012505673B2

(12) United States Patent
Kaushik et al.

(10) Patent No.: US 12,505,673 B2
(45) Date of Patent: Dec. 23, 2025

(54) MULTIMODAL GAME VIDEO SUMMARIZATION WITH METADATA

(71) Applicant: Sony Interactive Entertainment Inc., Tokyo (JP)

(72) Inventors: Lakshmish Kaushik, San Mateo, CA (US); Saket Kumar, San Mateo, CA (US); Jaekwon Yoo, San Mateo, CA (US); Kevin Zhang, San Mateo, CA (US); Soheil Khorram, San Mateo, CA (US); Sharath Rao, San Mateo, CA (US); Ravi Sundaram, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 777 days.

(21) Appl. No.: 17/412,134

(22) Filed: Aug. 25, 2021

(65) Prior Publication Data
US 2022/0067385 A1    Mar. 3, 2022

Related U.S. Application Data

(60) Provisional application No. 63/074,352, filed on Sep. 3, 2020.

(51) Int. Cl.
*G06V 40/20*    (2022.01)
*G06N 20/00*    (2019.01)
*G06V 20/40*    (2022.01)

(52) U.S. Cl.
CPC ............. *G06V 20/47* (2022.01); *G06N 20/00* (2019.01); *G06V 40/20* (2022.01); *G06V 20/44* (2022.01)

(58) Field of Classification Search
CPC ........ G06V 20/47; G06V 40/20; G06V 20/44; G06N 20/00
See application file for complete search history.

(56) References Cited

U.S. PATENT DOCUMENTS 7,632,186 B2 * 12/2009 Spanton ................ A63F 13/86
463/40
7,725,829 B1 * 5/2010 Wong ................ G06F 16/4387
715/730

(Continued)

FOREIGN PATENT DOCUMENTS

CN    102262624 A    11/2011
JP    2008022103 A    1/2008

(Continued)

OTHER PUBLICATIONS

M. Dominguez et al., "Design and Evaluation of Afterthought—A System that Automatically Creates Highlight Cinematics for 3D Games", 2011, AAAI Conference, Seventh Conference, pp. 134-139. (Year: 2011).*

(Continued)

*Primary Examiner* — Andrew M Moyer
*Assistant Examiner* — D J Dhooge
(74) *Attorney, Agent, or Firm* — Fish & Richardson P.C.

(57) ABSTRACT

Video and audio from a computer simulation are processed by a machine learning engine to identify candidate segments of the simulation for use in a video summary of the simulation. Text input is then used to reinforce whether a candidate segment should be included in the video summary. Metadata can be added to the summary showing game summary information.

21 Claims, 9 Drawing Sheets

(56) References Cited

U.S. PATENT DOCUMENTS

| | | | |
|---|---|---|---|
| 9,961,403 B2* | 5/2018 | Kritt | H04N 21/234318 |
| 10,363,488 B1* | 7/2019 | Willette | A63F 13/63 |
| 10,455,297 B1 | 10/2019 | Mahyar et al. | |
| 10,574,613 B2 | 2/2020 | Leiba et al. | |
| 10,592,751 B2 | 3/2020 | Chen et al. | |
| 11,235,248 B1 | 2/2022 | Orrino et al. | |
| 11,749,309 B2 | 9/2023 | Nakao et al. | |
| 2002/0083473 A1 | 6/2002 | Agnihotri et al. | |
| 2011/0009193 A1 | 1/2011 | Bond et al. | |
| 2012/0281114 A1 | 11/2012 | Shapiro et al. | |
| 2014/0123161 A1* | 5/2014 | van Coppenolle | H04N 21/2543 725/8 |
| 2014/0181668 A1 | 6/2014 | Kritt et al. | |
| 2014/0331246 A1 | 11/2014 | Schneiderman et al. | |
| 2016/0014482 A1 | 1/2016 | Chen et al. | |
| 2016/0225405 A1 | 8/2016 | Matias et al. | |
| 2016/0364606 A1 | 12/2016 | Conway et al. | |
| 2017/0003740 A1 | 1/2017 | Verfaillie et al. | |
| 2017/0169853 A1 | 6/2017 | Hu et al. | |
| 2017/0228600 A1* | 8/2017 | Syed | G06V 20/62 |
| 2017/0371496 A1 | 12/2017 | Denoue et al. | |
| 2018/0054659 A1 | 2/2018 | Goswami | |
| 2018/0341705 A1 | 11/2018 | Kim et al. | |
| 2019/0244639 A1 | 8/2019 | Benedetto | |
| 2019/0392866 A1* | 12/2019 | Yoon | G11B 27/28 |
| 2020/0126370 A1 | 4/2020 | Zalewski et al. | |
| 2020/0129855 A1 | 4/2020 | Ambinder et al. | |
| 2020/0155943 A1 | 5/2020 | Eatedali et al. | |
| 2020/0177655 A1 | 6/2020 | Ong et al. | |
| 2020/0195988 A1 | 6/2020 | Zavesky et al. | |
| 2020/0206631 A1 | 7/2020 | Sumant et al. | |
| 2020/0218585 A1 | 7/2020 | Dotan-Cohen et al. | |
| 2020/0297262 A1 | 9/2020 | Chappell, III et al. | |
| 2020/0298100 A1 | 9/2020 | Ambinder et al. | |
| 2020/0298131 A1 | 9/2020 | Pinto et al. | |
| 2020/0365188 A1* | 11/2020 | Brinkman, Jr. | H04N 21/472 |
| 2021/0110166 A1 | 4/2021 | Gunawardena | |
| 2021/0201045 A1 | 7/2021 | Iyer | |
| 2021/0209651 A1 | 7/2021 | Mossoba et al. | |
| 2021/0236944 A1 | 8/2021 | Summa et al. | |
| 2021/0331072 A1 | 10/2021 | Gibbon et al. | |
| 2021/0383127 A1 | 12/2021 | Kikin-Gil et al. | |
| 2021/0397613 A1 | 12/2021 | Swint et al. | |
| 2022/0067384 A1 | 3/2022 | Kaushik et al. | |

FOREIGN PATENT DOCUMENTS

| | | | |
|---|---|---|---|
| JP | 2017229060 A | | 12/2017 |
| JP | 2018124969 A | | 8/2018 |
| JP | 2018520772 A | | 8/2018 |
| JP | 2020121102 A | | 8/2020 |
| TW | M591655 U | | 3/2020 |
| TW | M594202 U | | 4/2020 |
| WO | WO 2017004433 A1 | | 1/2017 |
| WO | 2018125559 A1 | | 7/2018 |
| WO | 2019068035 A1 | | 4/2019 |
| WO | WO 2019187493 A1 | | 10/2019 |

OTHER PUBLICATIONS

Kaushik et al., "Multimodal Game Video Summarization", related U.S. Appl. No. 17/105,375, Applicant's Appeal Brief in response to Final Office Action filed Nov. 16, 2023.

Kaushik et al., "Multimodal Game Video Summarization", related U.S. Appl. No. 17/105,375, Final Office Action dated Nov. 14, 2023.

Kaushik et al., "Multimodal Game Video Summarization", file history of related U.S. Appl. No. 17/105,375, filed Nov. 25, 2020.

"International Search Report and Written Opinion", dated Feb. 15, 2022 and issued in the counterpart PCT application PCT/US21/49090.

"International Search Report and Written Opinion", dated Jan. 11, 2022 from PCT application PCT/US21/061100.

Kaushik et al., "Multimodal Game Video Summarization", related U.S. Appl. No. 17/105,375, Applicant's response to Non-Final Office Action filed Aug. 3, 2024.

Kaushik et al., "Multimodal Game Video Summarization", related U.S. Appl. No. 17/105,375, Non-Final Office Action dated May 17, 2024.

Extended European Search Report in European Appln. No. 21865205, mailed on Sep. 23, 2024, 7 pages.

* cited by examiner

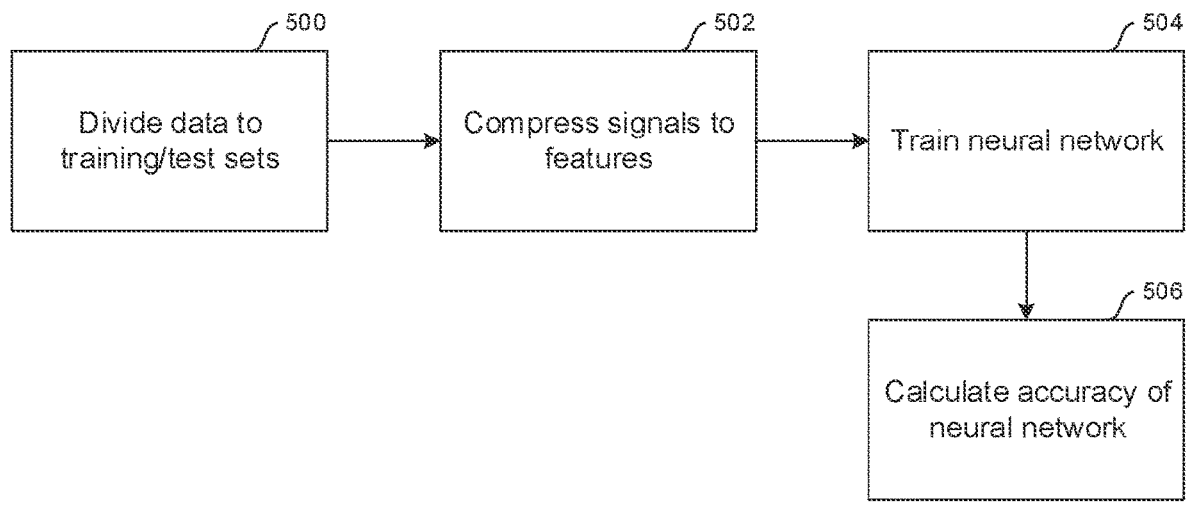
FIG. 5  Acoustic Event Detector
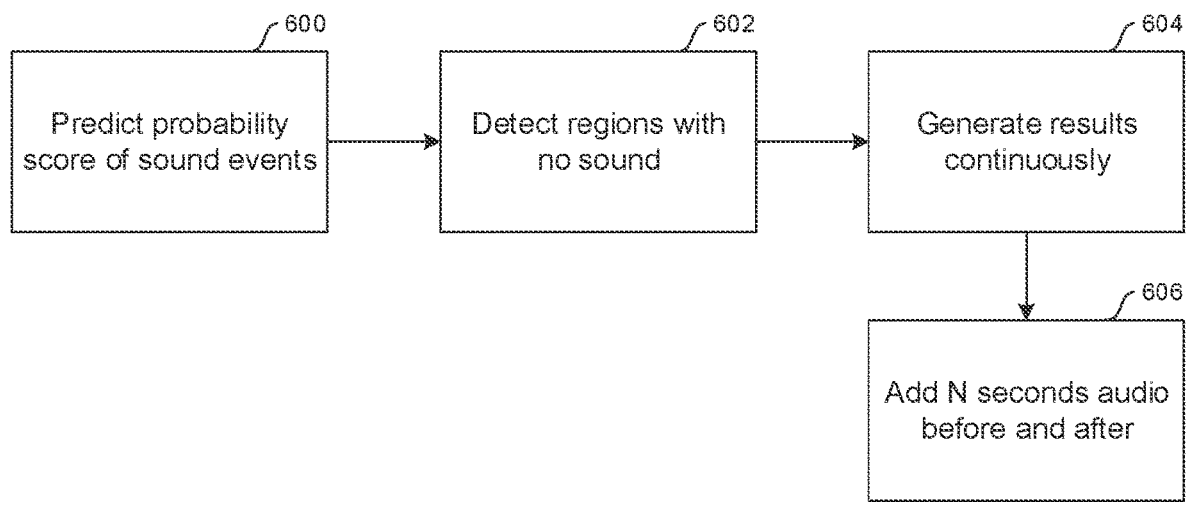
FIG. 6

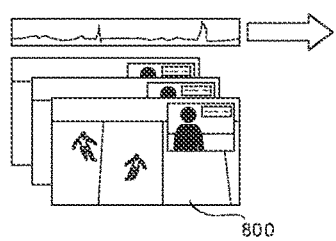
FIG. 8
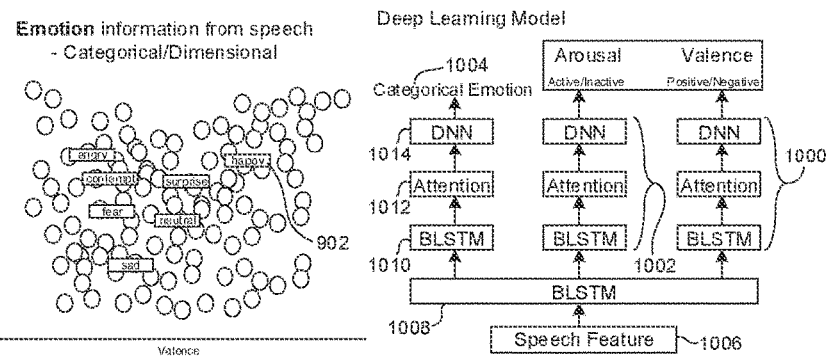
FIG. 9
FIG. 10
- System Block diagram
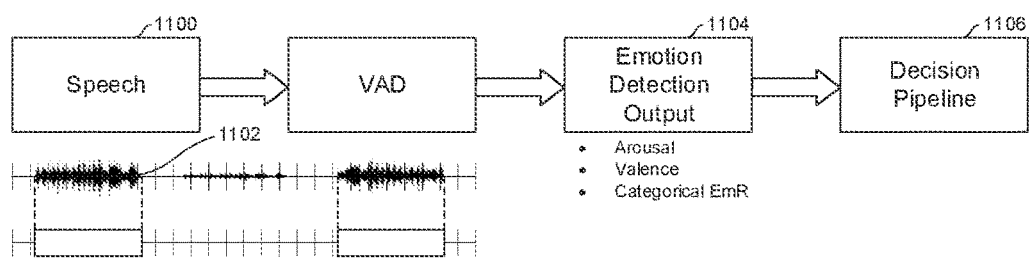
FIG. 11

MULTIMODAL GAME VIDEO SUMMARIZATION WITH METADATA

FIELD

The application relates generally to multimodal game video summarization in computer simulations and other applications.

BACKGROUND

A video summary of a computer simulation video or other video would generate a concise video for quickly viewing highlights for, e.g., a spectating platform or online gaming platform to enhance the spectating experience. As understood herein, generating an effective summary video automatically is difficult, and generating a summary manually is time-consuming.

SUMMARY

An apparatus includes at least one processor programmed with instructions to receive audio-video (AV) data and provide a video summary of the AV data that is shorter than the AV data at least in part by input to a machine learning (ML) engine first modality data. The instructions are also executable to input to the ML engine second modality data. Further, the instructions are executable to receive the video summary of the AV data from the ML engine responsive to the inputting of the first and second modality data, and to present in the video data metadata aligned in time with the first and second modality data such that the metadata is perceptible in the video summary.

The first modality data may include audio from the AV data and the second modality data may include computer simulation video from the AV data.

In example embodiments the metadata can represent any combination of game event data, emotion, audio, and video features extracted from the AV data, and likes for certain portions of the AV data.

In non-limiting examples the instructions can be executable to highlight portions of video that are subject the metadata. If desired, the instructions can be executable to present the metadata as text in the video summary.

In another aspect, a method includes identifying an audio-video (AV) entity, and using audio from the AV entity, identifying plural first candidate segments of the AV entity for establishing a summary of the entity. The method also includes using video from the AV entity, identifying plural second candidate segments of the AV entity for establishing a summary of the entity. Further, the method includes using the at least some of the plural first and second candidate segments, generating a video summary of the AV entity that is shorter than the AV entity, and presenting in the video summary, in human-perceptible form, metadata related to the video summary.

In another aspect, an assembly includes at least one display apparatus configured to present an audio-video (AV) computer game, and at least one processor associated with the display apparatus and configured with instructions to execute a machine learning (ML) engine to generate a video summary of the computer game that is shorter than the computer game. The instructions are executable to present in the video data metadata derived from game play and/or from the ML engine.

The details of the present application, both as to its structure and operation, can best be understood in reference to the accompanying drawings, in which like reference numerals refer to like parts, and in which:

BRIEF DESCRIPTION OF THE DRAWINGS

FIG. 5 illustrates example logic in example flow chart format for acoustical event detection;

FIG. 6 illustrates additional example logic in example flow chart format for acoustical event detection;

FIGS. 8 and 9 graphically illustrate acoustical input;

FIG. 10 illustrates an example ML engine or deep learning model for outputting speech features;

FIG. 11 is a block diagram of an example system for processing emotion detection;

DETAILED DESCRIPTION

Figure 1:
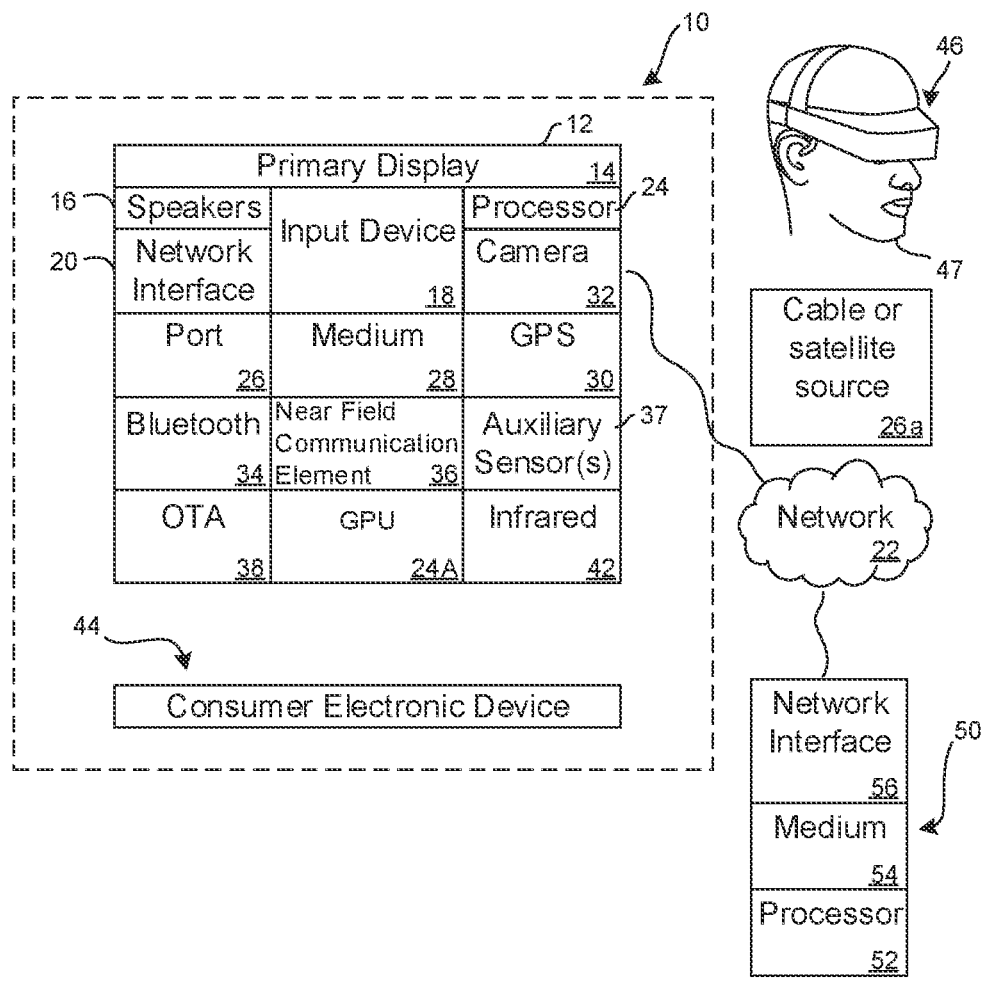
FIG. 1 is a block diagram of an example system showing computer components some or all of which may be used in various embodiments.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony Play Station® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a computer game console that can be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or a head-mounted display (HMD) worn by a player 47. In the example shown, only two CE devices 44, 46 are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

Figure 2:
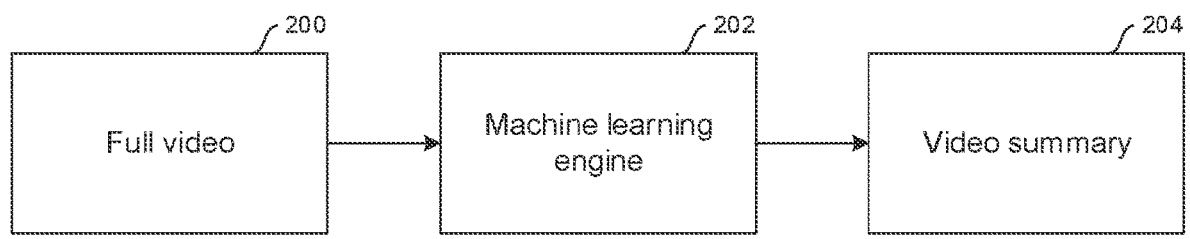
FIG. 2 illustrated generating a video summary of a full video using a machine learning (ML) engine.

FIG. 2 illustrates overall logic that may be executed by any appropriate processor described herein. Commencing at block 200, an audio video (AV) entity such as a full computer simulation or computer game recording or stream is identified and input to a machine learning (ML) engine 202. The ML engine 202 may include one or more individual ML models as further described below to output at 204 a video summary of the AV entity received at block 200, with the video summary 204 being shorter than the AV entity 200 and containing a series of segments from the AV entity that the ML engine 202 has identified as being interesting highlights.

It is to be understood that audio is first stripped from the video of the AV entity, and the audio and video are aligned in time (e.g., using timestamps) and processed by respective ML models in segments that may be, e.g., five seconds or other period in length. The segments are contiguous to each other and together make up the AV entity. Each ML model outputs a probability of an interesting segment, and a segment whose probability from either audio or video processing satisfies a threshold is a candidate for inclusion in the video summary 204, which includes audio and video of selected segments plus, if desired, X seconds of AV content on both sides of selected segments. As discussed further below, while both audio and video are used to identify candidate segments for the video summary, to avoid over-inclusion (and, hence, a too-long video summary), text from chat associated with the AV entity may be used to reinforce identified segments. This essentially limits the total length of segments that are included in the video summary to be no more than a predefined percentage of the full AV entity by eliminating candidate segments whose associated text from chat indicates less interest than other candidate segments.

Figure 3:
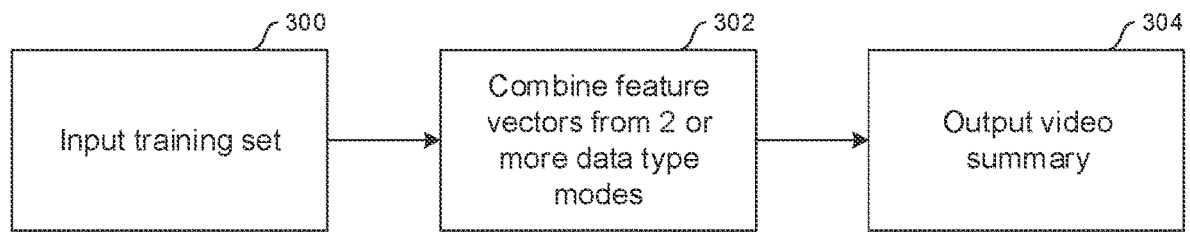
FIG. 3 illustrates overall logic in example flow chart format.

A ML model may be trained as shown in FIG. 3 by inputting a training set of data correlating types of data that may be received in an AV entity with desired decisions regarding that data. In an example, gameplay videos from an online service may be used and data therein annotated by an expert to enable a ML model to learn what data are good indicators of interesting events such that the ML model can indicate a segment of an AV entity suitable for incorporation into the summary "highlight" video.

Commencing at block 300, the training set of data is input to the ML engine, such as by inputting the training set to various ML models that are to process respective types of data in an AV entity. As discussed further below, at block 302 the ML engine combines feature vectors of two or more data type modes to output at 304 the video summary of an AV entity, the efficacy of the predictions of which may be annotated and fed back to the ML engine to refine its processing.

Figure 4:
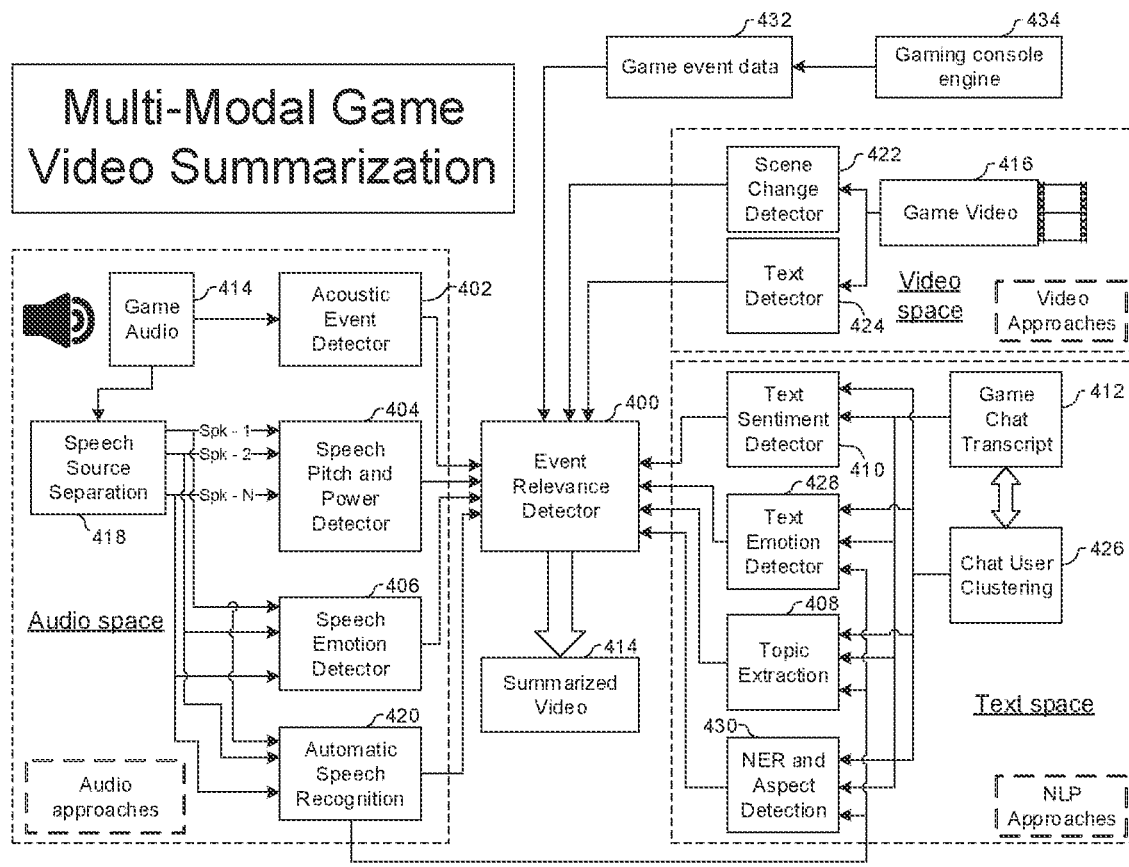
FIG. 4 illustrates an example architecture for multi-modal summarization.

FIG. 4 illustrates a ML model architecture. An event relevance detector (ERD) 400 receives input from an acoustic event detector 402, a pitch and power detector 404, and a speech emotion recognizer 406. The pitch and power detector identifies voice pitch and voice power in the audio. The ERD 400 may include a set of heuristic rules to apply to input probabilities received from the detectors 402, 404 and recognizer 406, which may be implemented by one or more ML models, to generate the video summary. Or, the ERD 400 may include a ML model trained to generate the video summary based on its inputs.

The acoustic event detector 402 is trained to identify events in segments of audio of the AV entity that indicate interesting content and thus indicate that a particular segment is a candidate for inclusion in the video summary. The acoustic event detector 402 is described further below and may include one or more layers of convolutional neural networks (CNN) to identify acoustic events as being interesting based on a training set of events that are predefined as being "interesting".

Similarly, the pitch and power detector 404 is a ML model trained to identify pitch and power in speech of the audio that indicates interesting content. Examples are higher voice pitches indicating more interest than lower pitches, or wider variations in pitch indicating more interest than narrower variations, and louder voices indicating more interest than quieter speech. The variations in pitch varies substantially where there is excitement and when an interesting event takes place, and this can be detected in their voice/speech. Thus, the regions of the sound with high power and sudden variations in speech can be classified as one of the candidate regions for highlight generation.

The speech emotion ML model 406 is trained to identify emotion in the audio to identify interesting emotions. One or both of categorical emotion detection and dimensional emotion detection may be used. Categorical emotion detections may detect plural (e.g., ten) different categories of emotions such as but not limited to happiness, sadness, anger, anticipation, fear, loneliness, jealousy, and disgust. Dimensional emotion detection has two variables, namely, arousal and valence.

FIG. 4 also shows that the ERD 400 receives input from a text topic extractor model 408 trained to identify topics of text associated with chat related to the AV entity, such as a computer game chat. It is common for viewers to use emoticons in game chat; thus, emoticons also contain critical information in detecting the topics. This can be tackled in a methodology in which emoticons are converted into corresponding text. This can serve as additional information to the topic detection module. Topics may be identified from predefined glossaries or annotations for a given AV topic domain. For example, for a war game a first glossary or set of annotations identifying interesting topics may be used while for an e-sport a second glossary or set of annotations identifying interesting topics may be used, with the text topic extractor being trained to identify text topics and which topics, based on the glossary or annotations, indicate a segment of interest. Topic detection can be achieved using a statistical method such as Latent Dirichlet Allocation (LDA), which classifies text in the chat to a particular topic. Chats can be taken independently, or they can be grouped together to improve the performance. Modern deep learning-based techniques for Natural Language Processing (NLP) can also be used for topic modeling. Bidirectional Encoder Representations from Transformers (BERT) can be used for performing downstream tasks in NLP such as topic detection, sentiment classification. In addition to these, a hybrid model which uses BERT, LDA and clustering could also be employed to detect the segment of the text which can be considered as a candidate event.

The ERD 400 also may receive input from a text sentiment analyzer or detector model 410 that is trained to identify parameters such as but not limited to sentiment and emotion in text associated with the chat 412 related to the AV entity. Sentiment is different from emotion, in that sentiment is generally positive or negative while emotion is more specific as discussed further below. Positive sentiment for example may be correlated to an interesting segment and negative sentiment may be correlated to a less interesting segment.

The ERD 400 receives probabilities from the ML models described herein to identify plural candidate segments of the AV entity on the basis of an audio-based or video-based probability for a segment satisfying a threshold. The ERD 400 selects a subset of the plural candidate segments based on chat text-based probabilities to establish the video summary.

FIG. 4 illustrates audio 414 that has been separated from video 416 of the AV entity being summarized is input to the acoustic event detector 402. The audio also is input to a speech source separation model 418 that separates voices in the audio in different channels using, e.g., voice and/or speech recognition principles, outputting each individual voice track in the segment being analyzed to the speech pitch and power detector 404. Similarly, each voice track is sent to the speech emotion detector 406 for separate analysis of each voice for emotion.

In addition, each voice track may be input to an automatic speech recognition (ASR) model 420, which converts the speech of each track to words and sends probabilities of the words indicating terms of interest as defined by the training set for the model to the ERD 400. The automatic speech recognition model 420 can also identify segments as uninteresting based on lengthy periods of no speech.

As shown in FIG. 4, the ML engine also includes a scene change detector ML model 422 receiving the AV entity video 416 for each segment and trained to identify scene changes in the video. The video also is input to a text detector 424 that detects any text such as closed captioning in the video. The video-based ML models send probabilities of interesting scene changes/video text, respectively, to the ERD 400.

Turn now to the chat text portion of the ML engine. Chat may be used to reinforce summary predictions based on video and audio. As shown in FIG. 4, chat user clustering 426 can be used in conjunction with the chat transcript 412 as input to the various chat-based ML models, including the text sentiment detector 410 and topic extraction model 408. Additionally, a text emotion detector model 428 may be trained to detect emotion in the chat text, outputting probabilities of interesting emotions to the ERD 400 based on a training set of predefined interesting emotions and the terms to which they correlate.

A named entity recognition (NER) and aspect detection (NERAD) model 430 may be used to output probabilities of interesting grammatical types detected in the input text based on a training set correlating words to interesting and uninteresting grammatical types. For example, the NERAD model 430 may output a probability that a term is a proper noun, which may be predefined to be of more interest than an adjective. The NERAD model 430 may also output probabilities that a brief summary of the text in the segment indicates an interesting or uninteresting segment.

Note that the chat text may include "stickers" or emoticons that may in some cases require purchase by a user to employ, meaning that attachment of such a sticker to chat may indicate greater interest in the corresponding segment to reinforce learning derived from other modalities.

Note further that in addition to receiving the text from the chat 412, the chat text-based models can also receive terms from the automatic speech recognition model 420 to process along with the terms in the chat text.

FIG. 4 also shows that game event data 432 from a gaming console engine 434 may be sent to the ERD 400. This data may include metadata such as game state, audio cues, video cues, and text cues. That is, if the engine 434 can access game state and other metadata it may be provided to the ERD. Such metadata is discussed further below in reference to FIG. 14.

FIG. 5 illustrates additional logic attendant to the acoustic event detector 402. Commencing at block 500, input audio signals are divided into training/test sets, and at block 502 the audio signals are compressed to feature vectors. The NNs of the acoustic event detector 402 are trained at block 504 using the features form block 502. The accuracy of the acoustic event detector 402 is determined at block 506 for feedback in the training process.

FIG. 6 illustrates that subsequent to training, the acoustic event detector 402 predicts, at block 600, the probability scores of sound events in each segment it analyzes for an AV entity to be summarized. Regions with no sound are detected at block 602. As indicated at 604 these results are generated continuously as the audio is continuously fed into the acoustic event detector 402 for delivery of the probabilities to the ERD 400. As indicated previously and shown in FIG. 6, "N" seconds of the immediately preceding and following segments may be added to a candidate interesting segment for the video summary.

Figure 7:
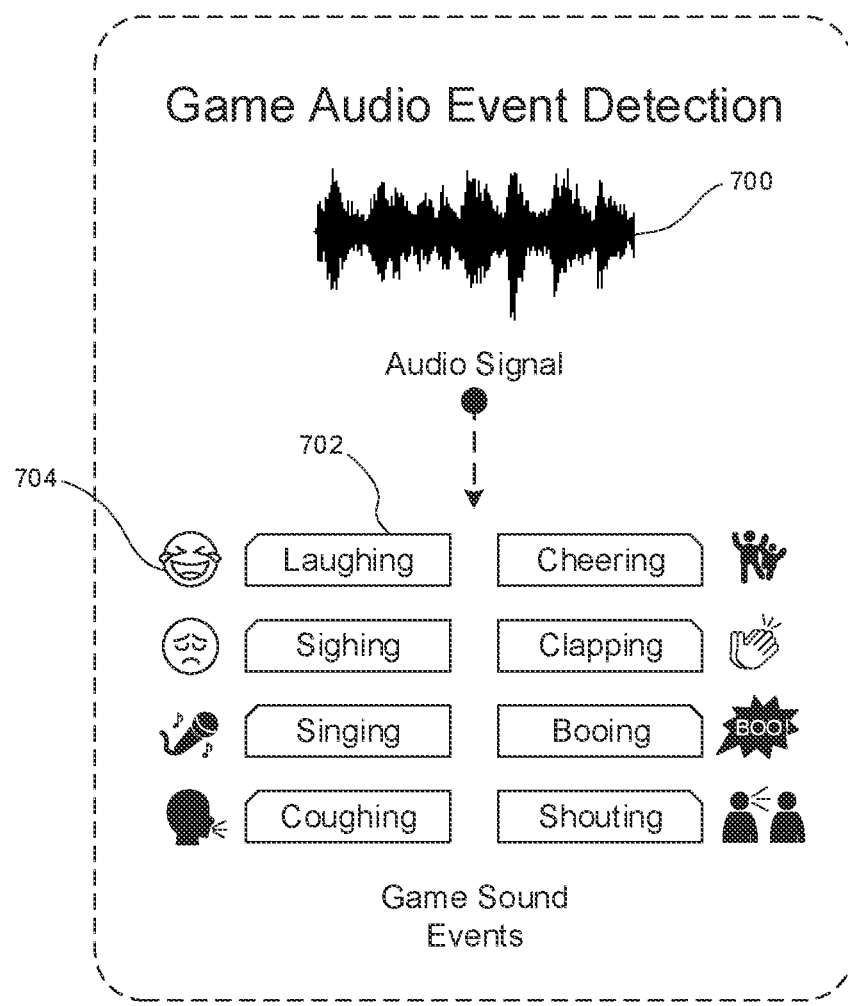
FIG. 7 illustrates acoustical events.

FIG. 7 illustrates that an audio signal 700 may be analyzed by the acoustic event detector 402 to identify various types 702 of events, such as laughing, sighing, singing, coughing, cheering, clapping, booing, and shouting. Based on the training set, some of the events indicate an interesting segment and some can indicate a non-interesting segment. Likewise, emoticons 704 may accompany the identified events for further classification.

FIGS. 8-11 illustrate further aspects of the speech emotion detector model 406. As shown in FIGS. 8 and 9, audio from multiple segments 800 of the AV entity can be broken down into categories and dimensions 902 including hot anger, cold anger, neutral, surprise, contempt, sad, happiness, etc. These categories are based on where they appear in the graph of FIG. 9, with the x-axis representing valence and the y-axis representing arousal.

FIG. 10 illustrates an example model architecture with three parallel processing paths, a first path 1000 for valence (either passive or negative), a second path 1002 for arousal (either active or inactive), and a third path 1004 for categorical emotion classification. Each path receives speech features 1006 as input and processes the input, in order, through a common bi-directional long short-term memory (BLSTM) 1008 and then a respective path BLSTM 1010, and attention layer 1012, and a deep neural network (DNN) 1014. Other models herein may employ similar neural networking components.

FIG. 11 illustrates that speech 1100 embodied in an audio signal segment 1102 is input to a voice activity detection (VAD) block 1104 to detect the presence or absence of speech and differentiate speech from non-speech. The output of the VAD 1104 is sent to the emotion detection architecture of FIG. 10 for outputting probabilities of emotion categories, valence, and arousal to a decision pipeline 1106. As discussed elsewhere herein, the decision pipeline 1106 determines whether the probability of any given emotion satisfies a threshold, and if so and the emotion is defined by the training set to be interesting, the corresponding segment of AV content from whence the segment under test was obtained is flagged as a candidate for inclusion in the video summary.

Figure 12:
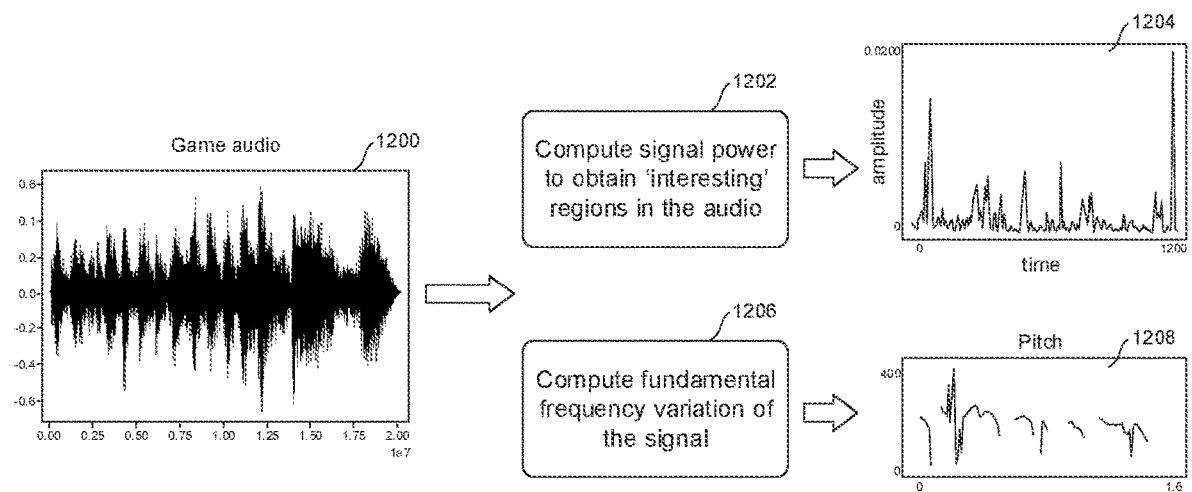
FIG. 12 illustrates processing of game audio for summarization.

FIG. 12 illustrates further aspects of the speech pitch and power detector 404. A segment 1200 of audio derived from a segment of the AV entity being summarized is used to compute 1202 signal power (i.e., amplitude) to identify interesting regions in the segment as defined in the training set for the model. These regions are shown at 1204 in the graph of power with the x-axis representing time and the y-axis representing amplitude.

Also, as indicated at 1206 the fundamental frequency variation (pitch variation) of the signal 1200 is identified. These variations are indicated at 1208. The model is trained to identify, from the shapes of the variations, interesting segments. ASR and NER as discussed above in relation to FIG. 4 may be used in this training.

Figure 13:
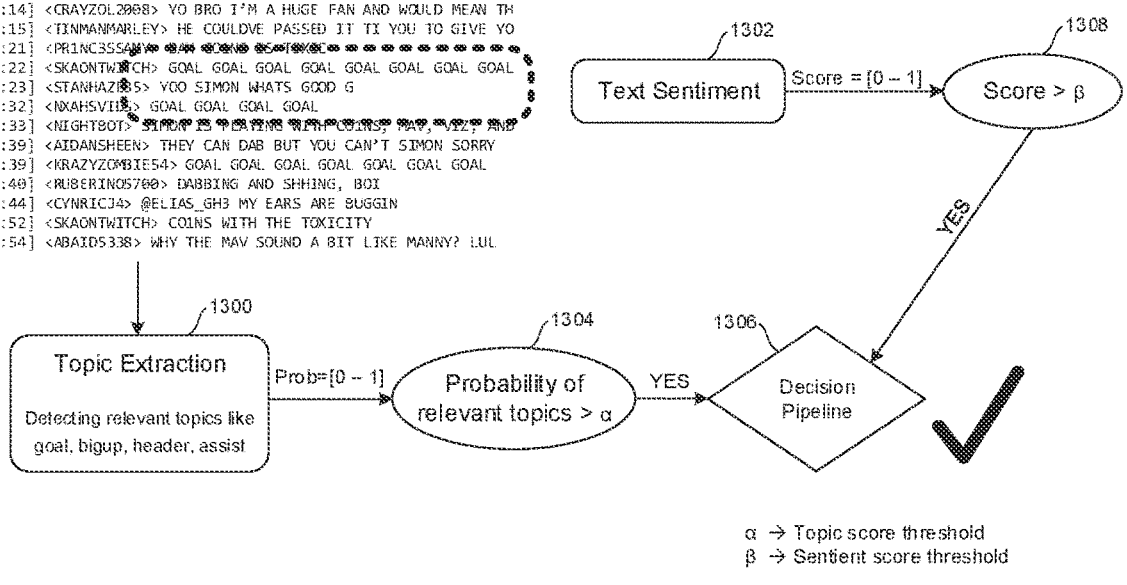
FIG. 13 illustrates text sentiment and topic extraction for summarization.

FIG. 13 illustrates the decision pipeline flow for two example audio parameters, in the example shown, probabilities of topics 1300 of chat text output by the text topic extractor 408 and sentiment 1302 of chat text output by the text sentiment analyzer 410, it being understood that similar decision pipelines may be used for the output probabilities of other parameters and other modes. If the probability of a topic identified as "interesting" from the text topic extractor 408 satisfies a first threshold α at state 1304, the segment from whence the topic was extracted is sent to state 1306 as a candidate segment for the video summary. Otherwise, the segment is not flagged as a candidate. Likewise, if the probability of a sentiment identified as "interesting" from the text sentiment analyzer 410 satisfies a second, potentially different threshold β at state 1308, the segment from whence the sentiment was extracted is sent to state 1306 as a candidate segment for the video summary. Otherwise, the segment is not flagged as a candidate. As discussed previously, assuming the same segment was identified by an audio or video modality model to be interesting, being additionally identified as interesting by the chat text modality can ensure it is included in the video summary, whereas not being identified as interesting by the chat text modality may result in the segment being nonetheless excluded from the video summary if necessary to maintain the length of the summary within the maximum allowed length.

Note that in embodiments in which the ERD 400 is implemented by a ML model, the ERD model may be trained using a set of audio, video, and chat text probabilities and corresponding video summaries derived therefrom as generated by human annotators.

Figure 14:
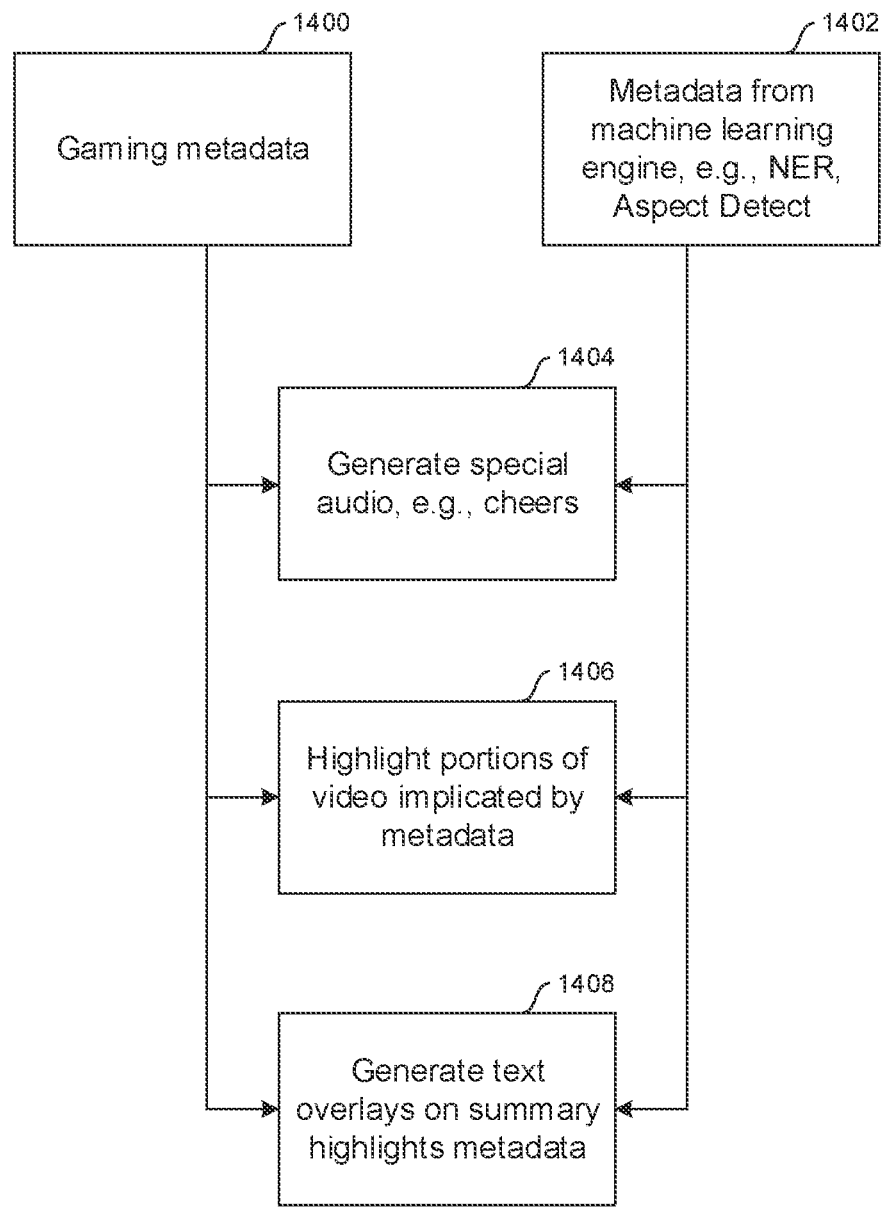
FIG. 14 illustrates aspects of metadata usage.

FIG. 14 illustrates aspects of metadata, referred to above, for use in connection with principles above. Metadata may be derived from text and/or video and/or audio as well as from game metadata as described in FIG. 4. It will be appreciated that in implementations without metadata the video summary ML engine is platform-independent and simply provides video summaries of input AV entities. FIG. 14 illustrates additional features that can be used when metadata is provided for. The metadata is aligned in time with the audio, video, and chat text of the video summary.

As indicated at 1400 and 1402, respectively, metadata may be received from both the game event data 434 in FIG. 4 and from the ML engine described herein. For example, metadata related to NER topics and Aspect detect topics, along with emotions, audio, and video features extracted as described herein along with the game event data may be used at block 1404 to generate special audio to be overlaid onto the audio of the AV segments establishing the video summary. The audio may include, for example, crowd cheers or boos as indicated by metadata features. The audio may include an audio message driven by gaming metadata such as a spoken message "the beast was killed here" in response to the gaming metadata indicating such an event. In other words, the audio metadata may announce metadata events and information as they arrive.

Block 1406 indicates that portions of video that are the subject of current time-aligned metadata may be visibly highlighted by, e.g., increasing the brightness of the portions, presenting a line around the portions, etc. For example, if the metadata includes a proper noun (name of a character), that character may be highlighted in the video summary during the time the metadata pertains to. In other words, any or all of the metadata may be visually indicated by highlighting the associated portions of the video summary.

The metadata also may be used at block 1408 to generate text that can be overlaid onto the video summary. Any or all of the metadata accordingly may be textually presented on a portion of the video summary. This metadata can include who has expressed likes for certain portions of the AV entity summarized in the video summary, themes present in the video summary as derived from, e.g., the Aspect Detection block, emoticons representing emotions indicated in the metadata, and so on.

It will be appreciated that whilst present principals have been described with reference to some example embodiments, these are not intended to be limiting, and that various alternative arrangements may be used to implement the subject matter claimed herein.

What is claimed is:

1. An apparatus comprising:
    at least one processor programmed with instructions to perform operations comprising:
        receiving audio-video (AV) data; and
        providing a displayable video summary of the AV data that is shorter than the AV data, comprising:
            inputting to a machine learning (ML) engine first modality data;
            inputting to the ML engine second modality data;
            identifying candidate segments of the displayable video summary of the AV data from the ML engine responsive to the inputting of the first and second modality data;
            after identifying the candidate segments of the displayable video summary of the AV data from the ML engine, eliminating, from the candidate segments, at least a first candidate segment from the candidate segments of the displayable video summary whose associated text from chat indicates less interest than at least a second candidate segment of the candidate segments of the displayable video summary to obtain a plurality of remaining candidate segments;

generating metadata representing one or more of game event data, emotion data, audio, or video features extracted from the AV data;

generating one or more overlay elements comprising audio segments or video segments that are based on the metadata, wherein the audio segments are determined from the one or more of audio, emotion data, or game event data; and overlaying the one or more overlay elements onto the plurality of remaining candidate segments of the displayable video summary.

2. The apparatus of claim 1, wherein the first modality data comprises audio from the AV data and the second modality data comprises computer simulation video from the AV data.

3. The apparatus of claim 1, wherein the operations comprise presenting in the displayable video summary metadata aligned in time with the first and second modality data such that the metadata is perceptible in the displayable video summary, wherein the metadata represents game event data.

4. The apparatus of claim 1, wherein the operations comprise presenting in the displayable video summary metadata aligned in time with the first and second modality data such that the metadata is perceptible in the displayable video summary, wherein the metadata represents emotion detected in the associated text from the chat.

5. The apparatus of claim 1, wherein the operations comprise presenting in the displayable video summary metadata aligned in time with the first and second modality data such that the metadata is perceptible in the displayable video summary, wherein the metadata represents audio and video features extracted from the AV data.

6. The apparatus of claim 1, wherein the operations comprise:
presenting in the displayable video summary metadata aligned in time with the first and second modality data such that the metadata is perceptible in the displayable video summary; and
highlighting portions of displayable video summary that are a subject of the metadata.

7. The apparatus of claim 1, wherein the operations comprise:
presenting in the displayable video summary metadata aligned in time with the first and second modality data such that the metadata is perceptible in the displayable video summary; and
presenting the metadata as text in the displayable video summary.

8. The apparatus of claim 1, wherein the operations comprise presenting in the displayable video summary metadata aligned in time with the first and second modality data such that the metadata is perceptible in the displayable video summary, wherein the metadata indicates likes for certain portions of the AV data.

9. The method of claim 1, wherein when the one or more overlay elements comprise audio segments, the audio segments comprise (i) reaction sounds determined from the audio or emotion data, or (ii) spoken messages generated in response to game event data, or when the one or more overlay elements comprise video segments, the video segments comprise visual highlighting information that indicates portions of the displayable video summary to be visibly highlighted by increasing brightness of the portions or presenting a boundary line around the portions.

10. A computer-implemented method comprising:
receiving audio-video (AV) data;
inputting to a machine learning (ML) engine first modality data;
inputting to the ML engine second modality data;
identifying candidate segments of the displayable video summary of the AV data from the ML engine responsive to the inputting of the first and second modality data;
after identifying the candidate segments of the displayable video summary of the AV data from the ML engine, eliminating, from the candidate segments, at least a first candidate segment from the candidate segments of the displayable video summary whose associated text from chat indicates less interest than at least a second candidate segment of the candidate segments of the displayable video summary to obtain a plurality of remaining candidate segments;
generating metadata representing one or more of game event data, emotion data, audio, or video features extracted from the AV data;
generating one or more overlay elements comprising audio segments or video segments that are based on the metadata, wherein the audio segments are determined from the one or more of audio, emotion data, or game event data;
overlaying the one or more overlay elements onto the plurality of remaining candidate segments of the displayable video summary; and
providing the displayable video summary of the AV data that is shorter than the AV data, the displayable video summary including the plurality of remaining candidate segments with the overlaid one or more overlay elements.

11. The method of claim 10, wherein the first modality data comprises audio from the AV data and the second modality data comprises computer simulation video from the AV data.

12. The method of claim 10, comprising presenting in the displayable video summary metadata aligned in time with the first and second modality data such that the metadata is perceptible in the displayable video summary, wherein the metadata represents game event data.

13. The method of claim 10, comprising presenting in the displayable video summary metadata aligned in time with the first and second modality data such that the metadata is perceptible in the displayable video summary, wherein the metadata represents emotion detected in the associated text from the chat.

14. The method of claim 10, comprising presenting in the displayable video summary metadata aligned in time with the first and second modality data such that the metadata is perceptible in the displayable video summary, wherein the metadata represents audio and video features extracted from the AV data.

15. The method of claim 10, comprising:
presenting in the displayable video summary metadata aligned in time with the first and second modality data such that the metadata is perceptible in the displayable video summary; and
highlighting portions of displayable video summary that are a subject of the metadata.

16. The method of claim 10, comprising:
presenting in the displayable video summary metadata aligned in time with the first and second modality data such that the metadata is perceptible in the displayable video summary; and
presenting the metadata as text in the displayable video summary.

17. The method of claim 10, comprising presenting in the displayable video summary metadata aligned in time with the first and second modality data such that the metadata is perceptible in the displayable video summary, wherein the metadata indicates likes for certain portions of the AV data.

18. A non-transitory computer-readable medium that stores instructions which, when executed, cause one or more computer processors to perform operations comprising:
receiving audio-video (AV) data;
inputting to a machine learning (ML) engine first modality data;
inputting to the ML engine second modality data;
identifying candidate segments of the displayable video summary of the AV data from the ML engine responsive to the inputting of the first and second modality data;
after identifying the candidate segments of the displayable video summary of the AV data from the ML engine, eliminating, from the candidate segments, at least a first candidate segment from the candidate segments of the displayable video summary whose associated text from chat indicates less interest than at least a second candidate segment of the candidate segments of the displayable video summary to obtain a plurality of remaining candidate segments;
generating metadata representing one or more of game event data, emotion data, audio, or video features extracted from the AV data;
generating one or more overlay elements comprising audio segments or video segments that are based on the metadata, wherein the audio segments are determined from the one or more of audio, emotion data, or game event data;
overlaying the one or more overlay elements onto the plurality of remaining candidate segments of the displayable video summary; and
providing the displayable video summary of the AV data that is shorter than the AV data, the displayable video summary including the plurality of remaining candidate segments with the overlaid one or more overlay elements.

19. The medium of claim 18, wherein the first modality data comprises audio from the AV data and the second modality data comprises computer simulation video from the AV data.

20. The medium of claim 18, the operations comprising presenting in the displayable video summary metadata aligned in time with the first and second modality data such that the metadata is perceptible in the displayable video summary, wherein the metadata represents game event data.

21. The medium of claim 18, the operations comprising presenting in the displayable video summary metadata aligned in time with the first and second modality data such that the metadata is perceptible in the displayable video summary, wherein the metadata represents emotion detected in the associated text from the chat.

* * * * *